(12) United States Patent
Okamoto

(10) Patent No.: US 6,565,143 B2
(45) Date of Patent: May 20, 2003

(54) CAMPING CAR

(76) Inventor: Shinichi Okamoto, 193-2 Hasuda, Hasuda-shi, Saitama (JP), 349-0115

( * ) Notice: Subject to any disclaimer, the term of this patent is extended or adjusted under 35 U.S.C. 154(b) by 47 days.

(21) Appl. No.: 09/980,259

(22) PCT Filed: Apr. 3, 2001

(86) PCT No.: PCT/JP01/02899

§ 371 (c)(1),
(2), (4) Date: Nov. 1, 2001

(65) Prior Publication Data

US 2002/0135204 A1 Sep. 26, 2002

(30) Foreign Application Priority Data

| Apr. 5, 2000 | (JP) | ................................ | 2000-140923 |
| Mar. 29, 2001 | (JP) | ................................ | 2001-095083 |

(51) Int. Cl.[7] .................. B60P 3/34; B60J 7/08
(52) U.S. Cl. ............... 296/165; 296/156; 296/172; 296/176; 296/24.1; 296/26.04; 296/26.06
(58) Field of Search ................ 296/156, 160, 296/165, 172, 176, 24.1, 26.01, 26.04, 26.06, 26.07

(56) References Cited

U.S. PATENT DOCUMENTS

| 3,236,554 | A | * | 2/1966 | Cline | ..................... | 296/26.07 |
| 3,560,043 | A | * | 2/1971 | Harter | ..................... | 296/171 |
| 4,366,979 | A | | 1/1983 | Pillot | ..................... | 296/160 |
| 5,374,094 | A | * | 12/1994 | Smith et al. | ........... | 187/266 |

FOREIGN PATENT DOCUMENTS

| CA | 926448 | * | 5/1973 | .............. 296/26.07 |
| DE | 2717516 | * | 10/1978 | .............. 296/165 |
| EP | 0023466 | | 2/1981 | |
| EP | 0041689 | * | 12/1981 | .............. 296/176 |
| FR | 2375070 | * | 8/1978 | .............. 296/156 |
| FR | 2462305 | | 2/1981 | |
| GB | 1385118 | * | 2/1975 | .............. 296/165 |
| JP | 49114614 | | 10/1974 | |
| JP | 5625030 | | 3/1981 | |
| JP | 6126622 | | 2/1986 | |
| JP | 63201841 | | 12/1988 | |
| JP | 2121422 | | 10/1990 | |
| JP | 353334 | | 5/1991 | |
| JP | 353336 | | 5/1991 | |
| JP | 4128934 | | 11/1992 | |
| JP | 72012 | | 1/1995 | |
| JP | 995186 | | 4/1997 | |
| JP | 200052845 | | 2/2000 | |

OTHER PUBLICATIONS

Dormobile in Whales: Weekend with Martin Walter's Four–Berth Caravan, Blandon, The Autocar, Nov. 6, 1959.*

What you should know about Driving in the Wilderness, Popular Mechanics, 1968.*

* cited by examiner

Primary Examiner—Stephen Gordon
Assistant Examiner—Patricia Engle
(74) Attorney, Agent, or Firm—Richard M. Goldberg

(57) ABSTRACT

In a vehicle of a size of approximately a one-box car, a camping car which can be used also for transportation such as regular commutation, shopping and so on based on the ability of setting up a portion or entirety of a roof portion of the vehicle higher than a normal running state for ensuring a life space within the vehicle.

22 Claims, 12 Drawing Sheets

ID CAMPING CAR

TECHNICAL FIELD

The present invention relates to a camping car based on a small vehicle.

Specifically, the present invention relates to a highly usable and diversely available vehicle which can be utilized as a normal private car for commutation approximately in a size of a small one-box car or a two-box car, i.e., so-called 5-number or 3-number car, and readily converted to a full-scale camping car which is equipped with shower, toilet, kitchen, lavatory and so on, when used for leisure such as camping on weekend or the like, by extending upward the space within the car.

BACKGROUND ART

It appears to be Japanese's true character to want opportunities of staying in the nature. Outdoor activities such as camping are a good custom for urban persons who have few opportunities of staying in the nature to refresh mind and body, maintain the health, and so on. Outdoor lovers are increasing, and this tendency seems to be growing in the future as well.

However, since camping cars have historically been developed mainly in the rich United States and Europe where the countries are large, roads are wide, fuel is inexpensive, large and dedicated camping cars, like buses, adapted to the circumstance are dominating. They are not at all suited for the conditions of Japan where the fuel is expensive, the country is small, and roads are narrow. Specifically, owning a plurality of vehicles, i.e., a camping car dedicated to leisure such as camping and a vehicle for commutation, shopping and so on encounters difficulties even in ensuring a parking area therefor in an urban small space. Once in camping, the camping cars cannot run narrow and dirt roads and so on for accessing a camping field.

Moreover, such a large camping car can run merely 3 to 7 km per liter and is also wasteful in terms of fuel cost. It is therefore impossible to own it for average employees and so on with small disposable income, who are estimated to create most of the demand. On the other hand, full-scale small camping cars equipped with toilet, shower, kitchen and so on, suitable for the condition of the country, have been placed on the market recently in Japan as well. FIG. 1 shows an example. However, the prior art example shown in FIG. 1 is designed to realize an outdoor life within the vehicle. Thus, it is worth as a dedicated camping car, but it is still excessively large as a versatile vehicle which can be used also for commutation, shopping and so on, and impractical in terms of fuel economy, running performance and so on. At present, the large camping cars are not satisfied by a large number of persons and cannot respond to the high potential demand.

Also, a camping car having a fixed roof, on which a tent can be set up, as shown in FIG. 2, for example, as represented by Frendy manufactured by Matsuda, is beginning to be placed on the market.

The prior art shown in FIG. 2 is derived from a concept of manufacturing an RV car which is compact and can be used commonly for play, work, shopping and so on.

While the size of the vehicle is certainly reduced, the design shown in FIG. 2 is made to have an outdoor life with the roof used as a floor. Therefore, in a functional aspect, it is rudimental and merely increases a bit of beds, which have conventionally been provided. There is not any concept of providing a full-scale camping car which has shower, toilet, kitchen, lavatory and so on, so that there are still a lot of discontented persons.

On the other hand, Japanese Unexamined Patent Publication No. Hei 09-123826 discloses a camping car which has a tent unit pivotally attached to a rear portion of a back door opening of a vehicle body, extending outward therefrom. However, the aforementioned tent on the roof is merely moved to the back of the vehicle, so that this is insufficient in a functional aspect similarly to the foregoing.

Moreover, since the camping car shown in the foregoing publication sets up a tent outside the vehicle, it is inconvenient in use due to time consuming set-up and storage, requirements for outside operations in wind and rain for setting up or storing the tent, and so on.

Furthermore, generally, camping cars are required to have a motive force because a refuge must be made immediately due to flooding caused by a sudden weather change in the nature, and so on. The camping car shown in the aforementioned publication, however, takes time for storing the tent extending outward, and has a problem in the motive force.

In view of the situation of the prior art as described above, the present invention has its challenge to provide a structure of a camping car which has the size of an ordinary small car up to approximately a one-box car of three numbers, can be normally used also for shipping, commutation and so on, can be fully utilized as a camping car, and can be extremely readily converted into a fullscale camping car which has independent rooms suitable in use for shower, toilet, cooking and so on.

DISCLOSURE OF THE INVENTION

To achieve the above object, the structure of the present invention comprises, in a vehicle of a size such as a one-box car, a camping car which is based on the ability of setting up a portion or entirety of a roof portion of a vehicle higher than a normal running state for ensuring a living space within the vehicle, and that a diaphragm 6 is provided for separating the inside of the vehicle into front and rear spaces, wherein the rear side of the diaphragm 6 can be set up as an independent room 7 in use for shower, toilet and cooking, characterized in that when a front portion of the roof portion is set up above, front and rear spaces of the upper portion are separated by an upper diaphragm 8 coupled to the upper side of the diaphragm 6.

BRIEF DESCRIPTION OF THE DRAWINGS

FIG. 3 shows back views of an embodiment of a camping car according to the present invention, where

FIG. 4 shows side views before and after using the embodiment of the camping car according to the present invention, where

FIG. 5 shows back views before and after using the embodiment of the camping car according to the present invention, where

FIG. 12 shows an embodiment which moves upward the roof portion of the camping car according to the present invention, where

FIG. 19 shows an embodiment in which a uplurality of side plates, which extend in a lateral direction, are interposed between the roof portion and an upper portion of side walls of the camping car according to the present invention such that it is retractile in the vertical direction, where FIG. 20 shows an embodiment, in perspective views, which has a load storing garage installed in a rear end portion of the camping car according to the present invention, wherein the garage is pivotable about one of the left and right rear ends of the vehicle, where

BEST MODE FOR CARRYING OUT THE INVENTION

FIGS. 3 and 4 show a basic embodiment in the present invention, where FIG. 3 is a back view, and FIG. 4 is a side view.

Figure 1:
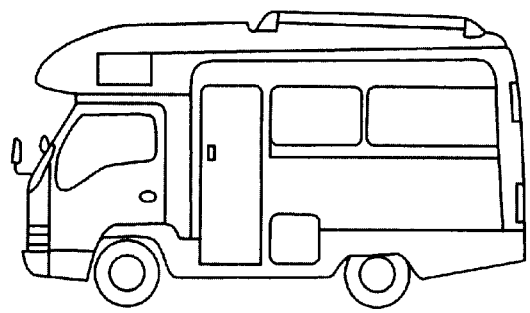
FIG. 1 is a side view showing an embodiment of a camping car according to a prior art method.
Figure 2:
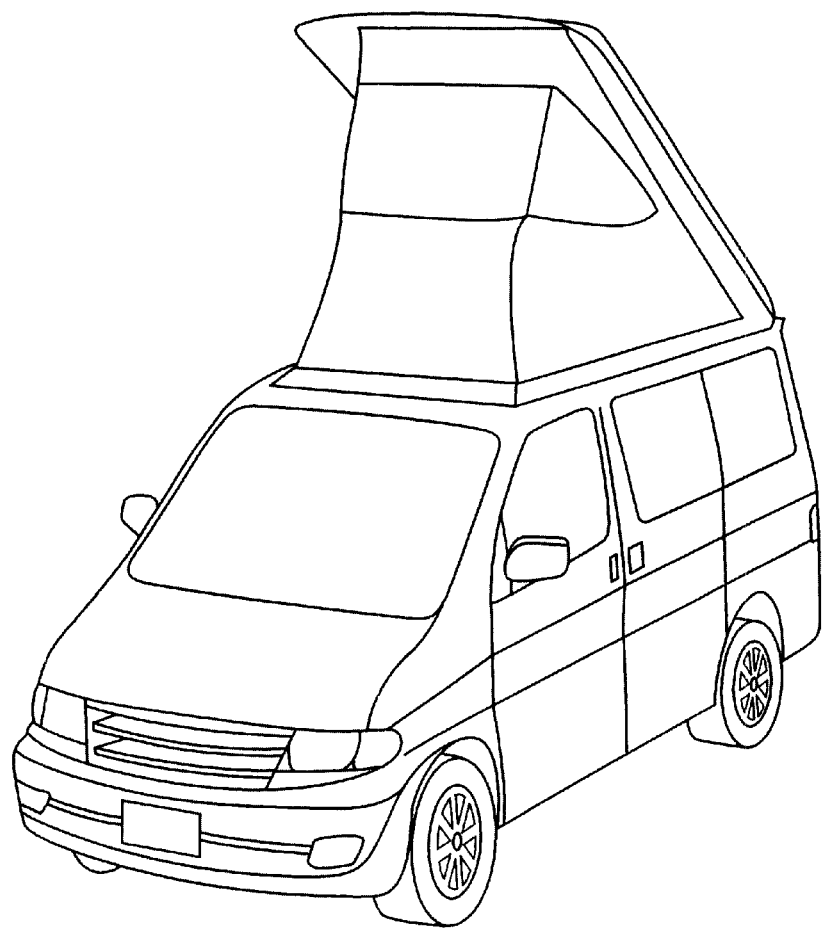
FIG. 2 is a perspective view showing an embodiment of a camping car according to a prior art method.
Figure 3A:
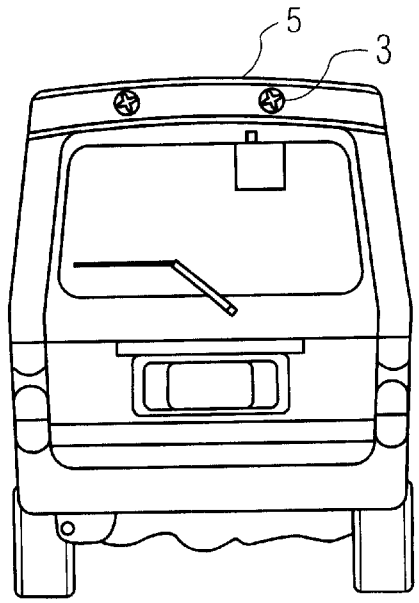
FIG. 3(a) shows a state before use and FIG. 3(b) shows a state after use.
Figure 3B:
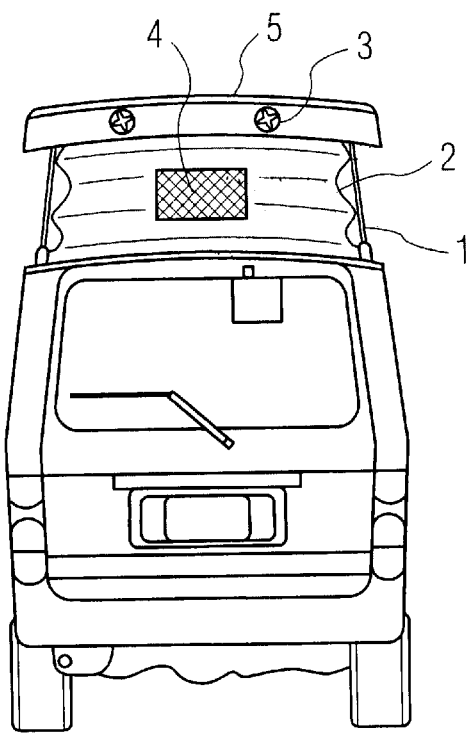

FIG. 3(a) is a back view during normal running, wherein it has an appearance that is not different from a rear view of a one-box car or the like which is normally running, with a ventilating opening of a forced pumping fan 3 which is only seen below a spoiler 5. Then, when in use for camping or the like, a roof portion is set up above as shown in FIG. 3(b). For setting up the roof portion above in this manner, both manual implementation and implementation through a pump-based automatic device can be employed.

While FIG. 3(b) shows that the roof portion is lifted up in parallel with the ground surface, the camping car is often constructed such that openings are exhaustively covered with a water-proof sheet 2 around the side surfaces of the roof portion, and the ventilation can be made through a mesh window 4 covered with a mosquito screen, a ventilating opening with a forced pumping fan 3, or the like.

When the roof portion is manually set up above, rod-like posts are conveniently used together with springs or the like. When the roof portion is automatically set up above, a hydraulic cylinder 1 associated with a pumping action is conveniently used.

Figure 4A:
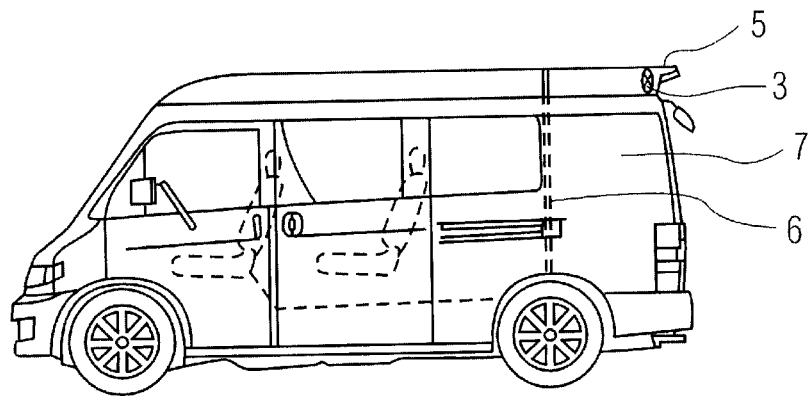
FIG. 4(a) shows a state before use as a camping car.
Figure 4B:
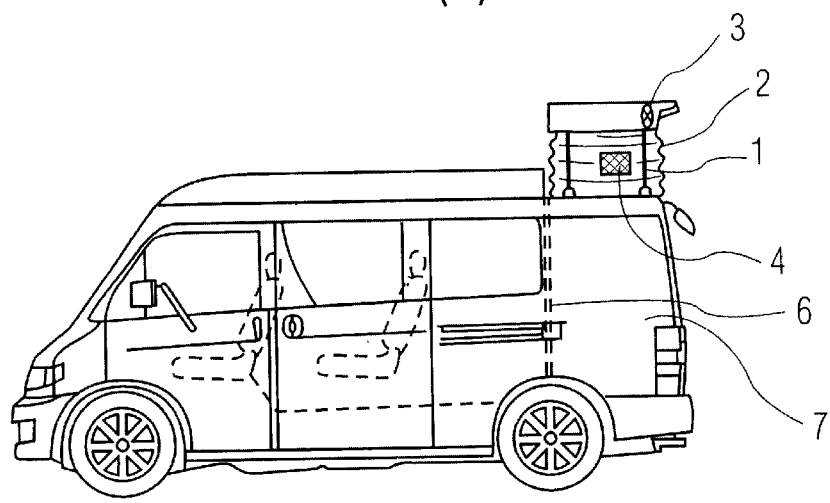
FIG. 4(b) shows the case where a portion of a roof portion can be set up above.
Figure 4C:
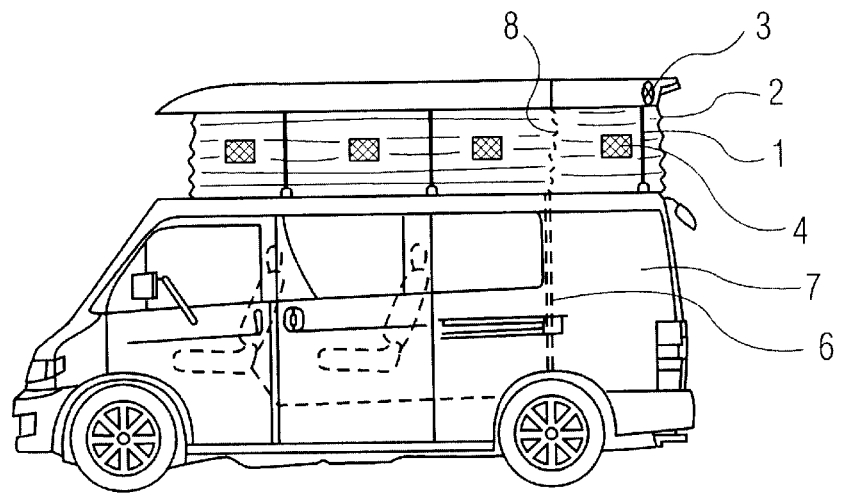
FIG. 4(c) shows the case where the entirety of the roof portion can be set up above.

FIG. 4(a) shows a normal running state, FIG. 4(b) shows that a portion of the roof portion is set up above, and FIG. 4(c) shows that the entire roof portion is set up above.

By setting up a portion or entirety of the roof portion above in this way, the floor of the vehicle can be diverted for an outdoor camping life, thereby effectively utilizing the space within the car in the present invention.

Then, as shown in FIGS. 4(a), 4(b) and 4(c), a diaphragm 6 is disposed for separating the vehicle into front and rear portions, and an independent room 7 may be conveniently provided in use for shower, toilet, cooking or the like in the rear portion of the vehicle.

The diaphragm 6 ensures to prevent injurious gas such as carbon monoxide, smell, humidity or the like from intruding from the independent room 7. In other words, the independent room 7 is desirably constructed to be a highly air-tight room separated from the front side portion of the car and allow for forced intake and exhaust only in this room.

FIG. 4(b) shows that a portion of the roof portion is set up above, wherein the roof portion is often set up over the independent room 7 when the independent room 7 is provided.

FIG. 4(c) shows that the entire roof portion is set up above, wherein when the independent room 7 is provided, an upper diaphragm 8 is provided on the diaphragm 6 to separate an upper space in the front-back direction, such that the diaphragm and the upper diaphragm 8 eventually separate the space in the front-back-direction of the vehicle in cooperation.

As shown in FIG. 4(c), when the entire roof is set up above, the user can act in a standing posture in the overall region in the front-back direction of the vehicle, thereby providing a more comfortable space. While sleeping, a slidable floor or the like may be provided in the middle such that the space can be used just like a two-stage bed. Then, the diaphragm 6 and the upper diaphragm 8 may be made of cloth such as a water-proof sheet, or plate.

Embodiments

While the roof portion is set up above substantially parallel with the ground surface in FIGS. 3 and 4, the constitution for setting up the roof portion above in the present invention is not limited to the foregoing case.

Figure 5A:
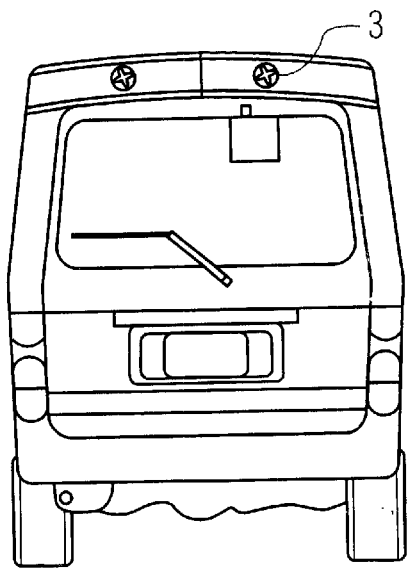
FIG. 5(a) shows a state before roof portions are pivoted.
Figure 5B:
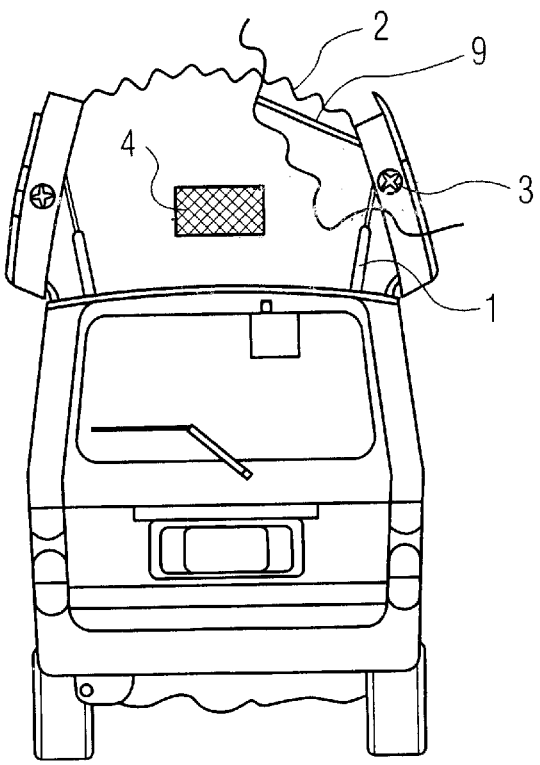
FIG. 5(b) shows a state in which the roof portions have been pivoted upward.

Specifically, as shown in FIGS. 5(a) and 5(b), upper left and right corners of the vehicle, when viewed from the back, are made pivotable with hinges or the like. Near the center of the roof of the vehicle, in addition to a separable state, a pump actuated hydraulic cylinder 1 or the like may be used to lift up both left and right sides in a pivoted state, thereby setting the roof portion above.

Then, the lifted-up roof portions can be used as side walls, while the water-proof sheet 2 is used to cover the portion between the separated roof portions to form a ceiling.

For forming the ceiling, it is possible to employ a structure in which reinforcement posts 9 are erected between the separated roof portions, and both upper ends of the reinforcement posts 9 and the roof portions are covered with the water-proof sheet 2.

Desirably, the water-proof sheet 2 has a hermeticity, and the reinforcement posts 9 are elastically deformable.

As a method of moving upward a region substantially near the center with the roof portion being pivoted, not only the method of lifting up by means of the hydraulic cylinder 1 as described above can be employed, but also it is possible to employ a structure in which the roof portion is urged for pivotal movement by means of a spring in response to a manual operation, and braked by a hydraulic or air cylinder not actuated by a pump to lightly open and close the roof portion and to employ a normal door lock structure which locks the roof portion when fastened slightly strongly.

Figure 6:
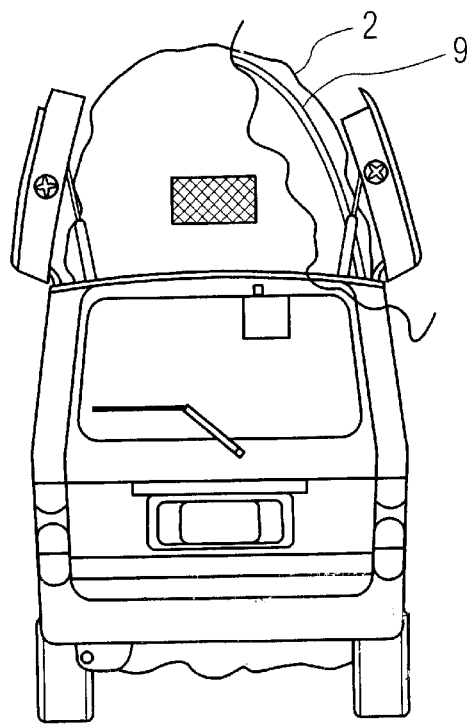
FIG. 6 is a back view showing a state in which roof portions are pivoted upward in another embodiment of the camping car according to the present invention.
Figure 7:
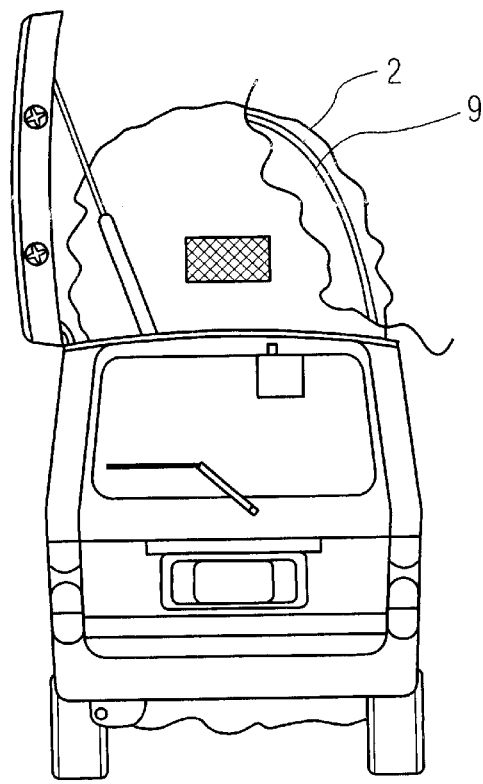
FIG. 7 is a back view showing a state in which a roof portion is pivoted upward in another embodiment of the camping car according to the present invention.

While the reinforcement post 9 is erected between the roof portions in FIG. 5, it is also possible to employ a method of forming the upper roof portion by making both right and left ends of the roof portion pivotable as shown in FIG. 6 or making one of the right and left ends pivotable, as shown in FIG. 7, moving it upward, afterward protrusively inserting the reinforcement post 9, which has an upwardly rising shape, into a hole formed in a side wall of the vehicle to erect the reinforcement post 9, and covering the water-proof sheet 2 from above the reinforcement post 9.

As the shape of the reinforcement post 9 employed in the embodiments shown in FIGS. 6 and 7, any of arc or rectangle shape may be selected.

Figure 8:
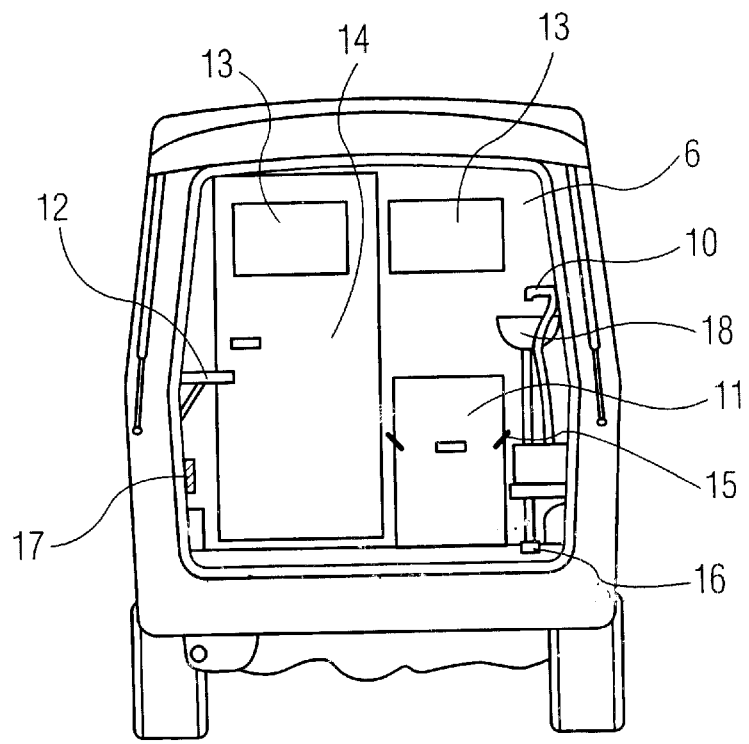
FIG. 8 is a back view showing an embodiment of a rear opening of the camping car according to the present invention.

FIG. 8 is a back view when a hatch back type back door, positioned at the rear end of the independent room 7, is opened, when the independent room 7 formed by the diaphragm 6 for separating the front and the rear is provided, as shown in FIG. 4.

Then, in the embodiment shown in FIG. 8, a garage 11 is provided in the independent room 7, wherein a simple toilet stool or the like is stored by a stopper 15 in a good air-tight state, so that it can be stored separately from a simple shower set 10 which is actuated by an electric submergible pump or the like.

The garage 11 may be provided with a ventilating opening extending through the vehicle in the downward direction or the like.

In the embodiment shown in FIG. 8, a range table 12 for placing a simple gas range or the like which can be set up only when it is used and normally let down, an air-tight window 13 which can be readily blindfolded by a curtain or the like, an air-tight door 14, a drain port 16, and an intake/exhaust port 17 are additionally provided.

For using the shower in such a structure, hot water boiled by the simple gas range or the like may be used, cooled down to an appropriate temperature, poured in a container, and used in a state of an electrically driven simple shower set.

Also, when the toilet is used, the simple toilet may be taken out from the garage 11. When the toilet is used, for the user to use it in a standing posture, it is desirable to take a state in which the roof is set up above. However, the roof may not be extended upward if a chair type simple toilet is used for the case of the toilet or the like, and it is also possible even during the running of the vehicle, or a lavatory 18 may be provided.

Figure 9:
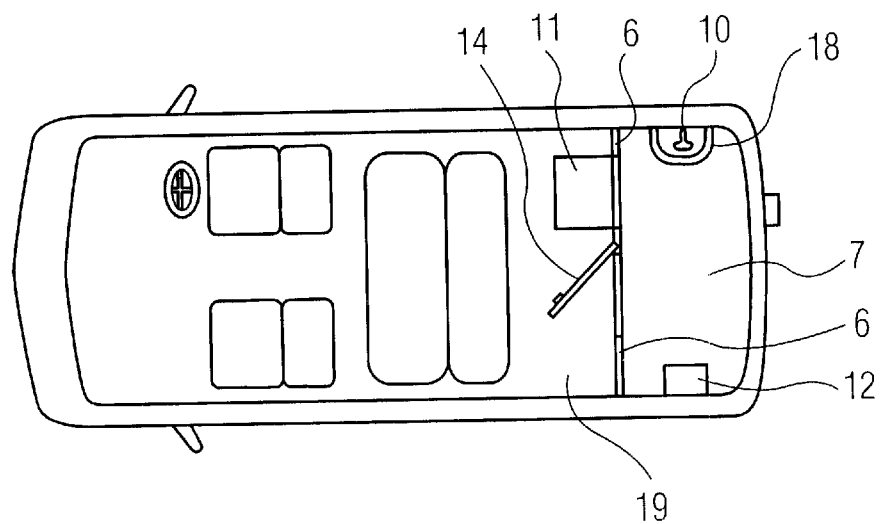
FIG. 9 is a plan layout diagram showing an embodiment of the camping car according to the present invention.

FIG. 9 is a general plan view of the layout within the vehicle which shows an embodiment when the independent room 7 is provided, wherein the independent room 7 is formed of the diaphragm 6 and a door 14, and the simple shower set 10, range table 12, lavatory 18 and so on are disposed. The garage 11 can be drawn to the front from the independent room 7.

Then, in front of the diaphragm 6, a space is provided between a rear seat and the diaphragm 6 for use as a load chamber 19.

Figure 10:
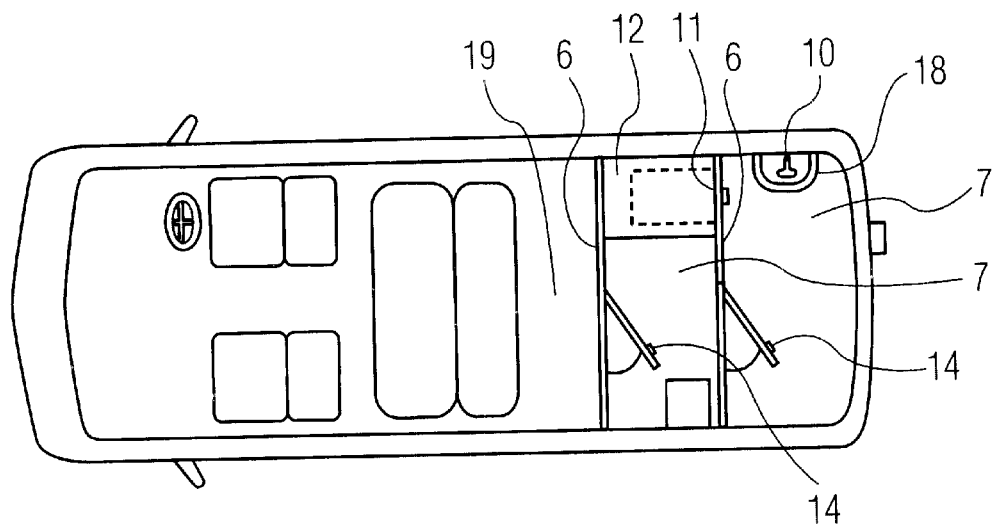
FIG. 10 is a plan layout diagram showing an embodiment of the camping car according to the present invention.

In the embodiment which is provided with the independent room 7, not only the single independent room 7 but also another independent room 7 or more may be provided by elongating slightly the length of the vehicle, for example, as shown in FIG. 10, to serve as a room dedicated to cooking or the like, in which case any of a plurality of diaphragm 6 and the upper diaphragm 8 is desirably disposed to provide a hermeticity in a manner similar to the foregoing.

As shown in FIG. 4, when the independent room 7 is provided, the forced pumping fan 3 is often disposed below the spoiler 5. Such disposition is derived from a requirement for actively preventing humidity, injurious gas and so on from filling in the room.

However, only an intake/exhaust port may be provided without the fan. Also, when a spoiler is used at the position of the forced pumping fan 3, rain can be prevented from intruding.

However, the position at which the spoiler is provided is not limited to the above-mentioned position, and it may be disposed, for example, in the ceiling or on a side surface.

While the spoiler is not necessarily indispensable, an intake port and forced exhaust facilities are desirably installed without fail in a kitchen room, since injurious gas is generated from the gas range.

Figure 11:
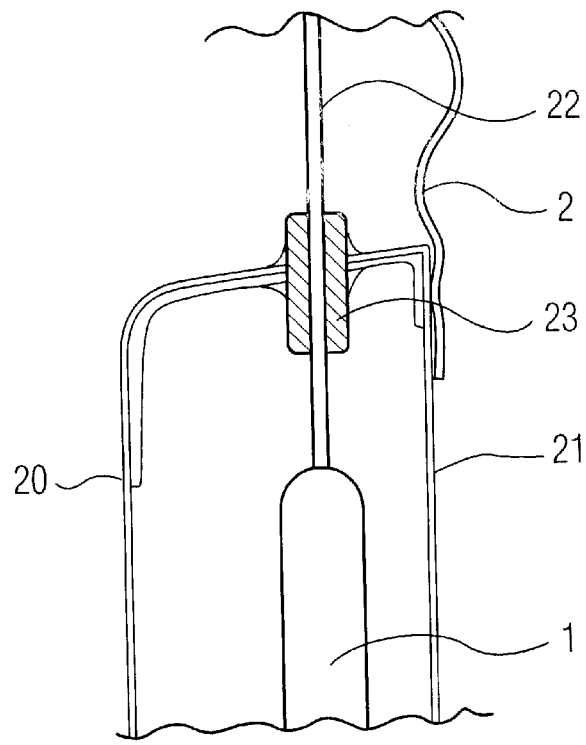
FIG. 11 is a side sectional view showing a position in the camping car according to the present invention at which a hydraulic cylinder is disposed.

In the present invention, the position of the hydraulic cylinder 1 employed for setting up the roof portion of the vehicle above when the pump-actuated hydraulic cylinder 1 is employed for posts 22 may be fixed with screws along the inner wall of the vehicle, when the roof portion is set up above substantially in parallel with the ground, as shown in FIGS. 3 and 4, but is desirably fixed and accommodated between an outer wall 20 and the inner wall 21 of the vehicle as shown in FIG. 11, since it may be an obstacle.

Then, when an accommodating method as shown in FIG. 11 is employed, an auxiliary member 23 may be added by soldering or the like for purposes of reinforcing the strength of the posts 22 of the hydraulic cylinder 1 as countermeasures to wind and rain, and preventing rain water from intruding.

Figure 12A:
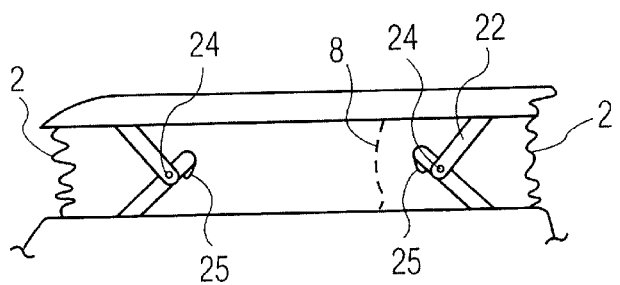
FIG. 12(a) is a side view showing an engagement relationship between an upper post and a lower port.
Figure 12B:
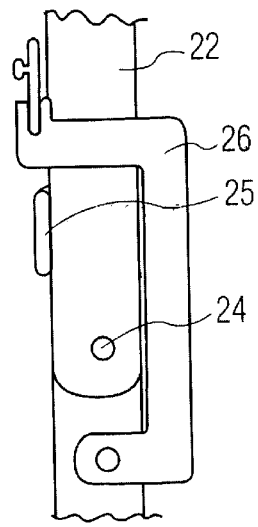
FIG. 12(b) is a side view showing a joining state when the upper post intersects the lower post, and the roof portion is set up above at a position at which they mutually pivot.

On the other hand, for manually realizing the roof portion set up above substantially in parallel with the ground surface, for example, as shown in FIGS. 12(a) and 12(b), a plurality of posts 22 are divided into two in the vertical direction, where vicinities of the upper ends of upper posts 22 are pivotally joined between the roof portion, while vicinities of lower ends of lower posts are pivotally joined between a side wall of the vehicle, and they are mutually pivotally joined at a position at which the upper posts 22 intersect the lower posts 22, thereby making it possible to employ a method of moving in the vertical direction by changing the joining angle.

Figure 13:
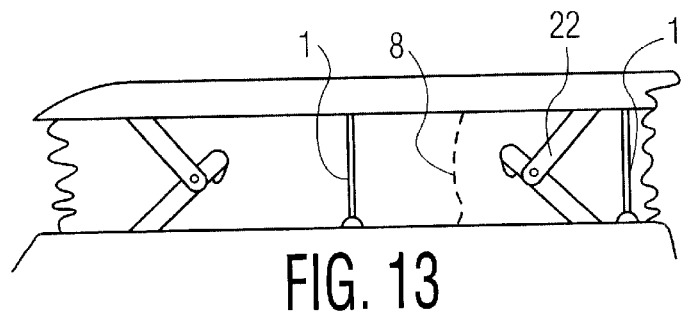
FIG. 13 is a side view of a region near the roof of a vehicle showing an embodiment which uses diagonal timbers for moving upward the roof portion of the camping car according to the present invention.

In the method shown in FIGS. 12(a) and 12(b), by urging the portion between the roof portion and the upper side of the vehicle with a spring or the like as started by a manual operation, and making it pivotally while braking with a hydraulic cylinder or the like, the user may lift up the roof portion upward with hands to fix the stopper 25 to a stopping aid part 26 for preventing bending. Alternatively, as shown in FIG. 13, pump-actuated hydraulic cylinders 1 may be used in combination, which is desirable from the fact that a sufficient strength can be provided for the posts 22 and that the operation is simple. Also, rod-like posts 22 may be used in place of the hydraulic cylinders 1 to realize a manual upward movement.

FIG. 12(b) is a side view showing a mutual joining state when the roof portion is set up above in the position at which the upper posts 22 are joined with the lower posts 22.

Figure 14:
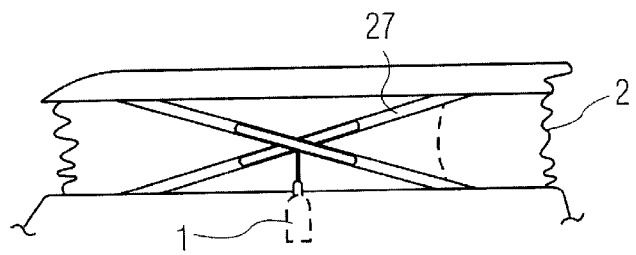
FIG. 14 is a side view of a region near the roof of the vehicle showing an embodiment which moves upward the roof portion of the camping car according to the present invention.

As shown in FIG. 14, a structure may be employed, in which fulcrums are set at the centers of two rods having a similar length, and diagonal timbers 27 pivoted about the fulcrums are disposed at two or more positions, and the roof portion of the vehicle is moved upward in parallel by means of the pump-actuated hydraulic cylinder 1 fixed near the fulcrums with screws or through manual operations.

Figure 15:
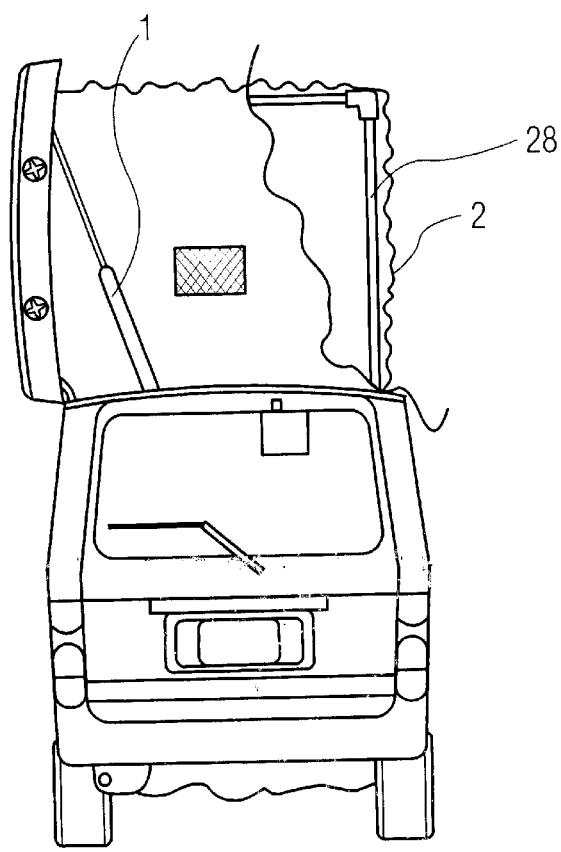
FIG. 15 is a back view of a vehicle showing an embodiment which moves upward the roof portion of the camping car according to the present invention.

As shown in FIG. 15, a structure may be employed, in which any one of the right and left sides of the roof portion of the vehicle is made pivotable, and an end of the roof portion, when pivoted, and an upper corner of the vehicle body are coupled by an elastic post 28, when the roof portion is set up at a high position, and the coupled portion is covered using the water-proof sheet 2, thereby setting up the roof above.

The structure shown in FIG. 15 is convenient in view of the following points: the strength can be sufficiently ensured since a tent is set up using the roof portion fixed by the hydraulic cylinder 1 or the like as a side wall; it is comfortable since the roof can be higher; and a high fuel economy can be provided since the height of the used vehicle can be reduced, and so on.

Figure 16:
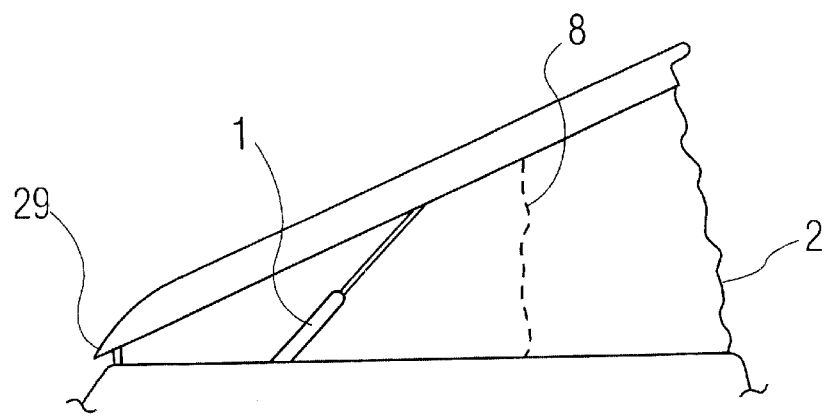
FIG. 16 is a side view of a region near the roof of the vehicle showing an embodiment which moves upward the roof portion of the camping car according to the present invention.

As shown in FIG. 16, it is possible to form an upper space of the vehicle by making the front end of the roof portion pivotable at 29, and covering both right and left sides and the rear side of the roof portion with the water-proof sheet 2 and the upper diaphragm 8, when the rear side of the roof portion is pivoted upward.

Figure 17:
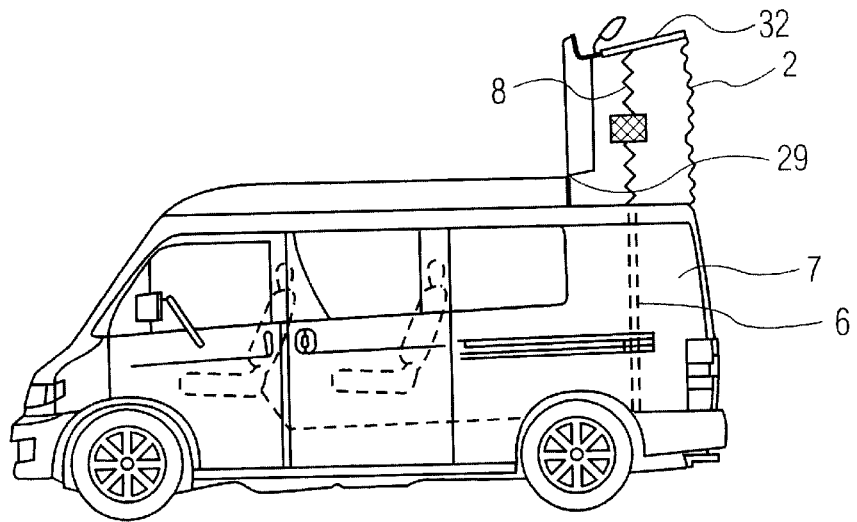
FIG. 17 is a side view of the vehicle showing an embodiment which moves upward the roof portion of the camping car according to the present invention.

As shown in FIG. 17, when the independent room 7 is formed, a structure can also be employed, in which a cross-section L-shaped wall 32 is formed with the roof portion and the rear side wall by making continuous from the roof portion of the vehicle to the rear wall portion of the vehicle substantially in L-shape in cross section, and making the rear side portion of the roof portion of the vehicle pivotable, such that when the L-shaped wall 32 is pivoted upward, a side portion and a rear portion of the pivoted portion are covered with the water-proof sheet 2.

In the present invention, the water-proof sheet may be previously fixed in close contact with the vehicle, or may be manually attached using a chuck or the like after the roof portion is lifted up.

Figure 18:
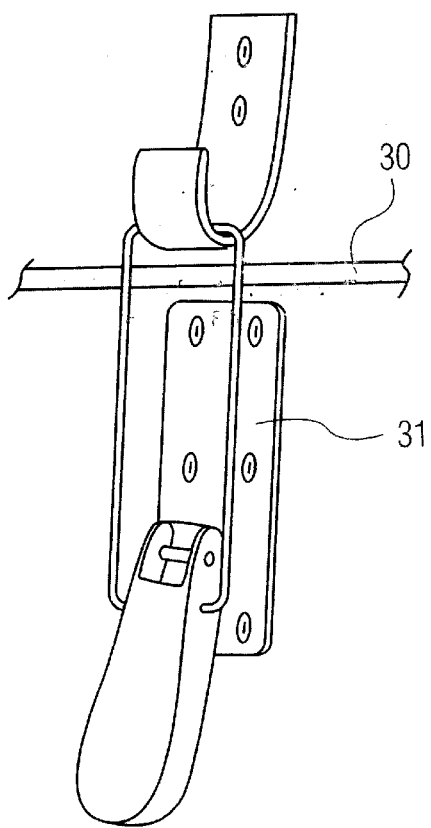
FIG. 18 is a perspective view showing an embodiment of a method of latching the roof portion with the body of the camping car according to the present invention.

In the present invention, since the roof portion, separated from the vehicle body, is set up above, a packing material 30 such as rubber is desirably used for eliminating a gap between the roof portion and the body and preventing rain water from intruding, for example, as shown in FIG. 18 during the running in a normal state in which the roof is down.

Further, latch members 31 or the like, for example, are desirably disposed at a plurality of positions, manually latched to be brought into press contact without fail. Alternatively, a system may be employed, in which a lock mechanism acts when it is powerfully fastened through a manual operation or the like, as used in doors of a normal vehicle.

The water-proof sheet 2 in the present invention may be any of sheets which are normally used for tents, and a material which is impermeable to water, high in tear strength, good in aging performance such as weather resistance and so on, and flexible can be used.

Specifically, water-proof cloth made of woven cloth of polyester, nylon or the like impregnated with rubber, a resin such as vinyl chloride or the like, a resin sheet and so on may be used, and a bellows-shaped one is desirable. Also, for the water-proof sheet 2, for purposes of ventilation, prevention of insects from entering into the vehicle and so on, mesh windows 4 which can be freely covered with the water-proof sheet in the event of rain or the like are desirably provided on the outer wall at a plurality of positions.

When the water-proof sheet 2 in the present invention is fixed in close contact with the vehicle, for storing it at the back of the roof in a normal use time, in which the roof of the vehicle is not extended upward, for example, a resin sheet provided with a chuck and an FRP-made or a metal-made rod, as required, are extended over the ceiling for coverage to prevent the water-proof sheet 2 from hanging down in the room, and when in use, the roof portion may be set up above after this chuck is opened.

As shown in FIGS. 3 and 4, in the embodiment in which the roof portion is set up above in a state substantially parallel with the ground surface, the periphery between the upwardly set-up roof portion and the side walls of the vehicle is covered with the water-proof sheet 2. However, the periphery is not limited to the case where the water-proof sheet 2 is employed, but it is possible to employ another material which is retractile in the vertical direction and has a water-proof characteristic.

Figure 19A:
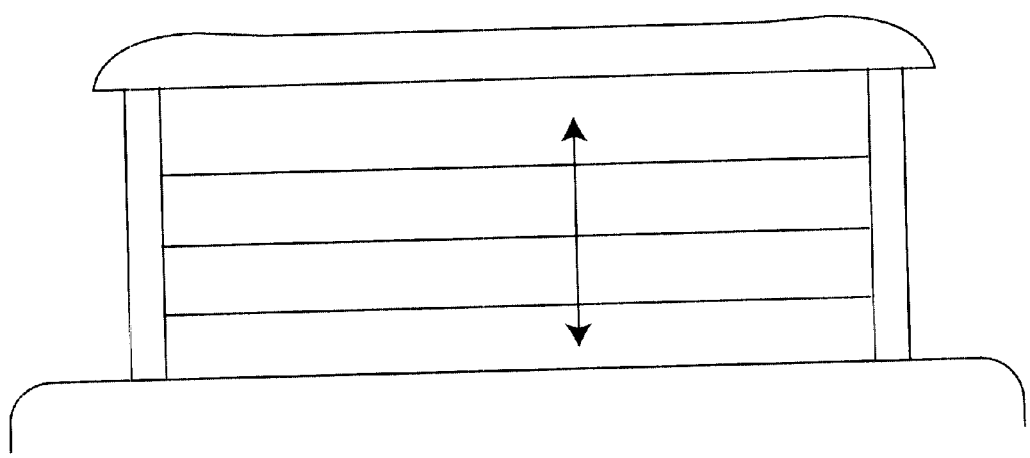
FIG. 19(a) is a side sectional view showing a state in which the side plates are movably fixed on both sides in the lateral direction.
Figure 19B:
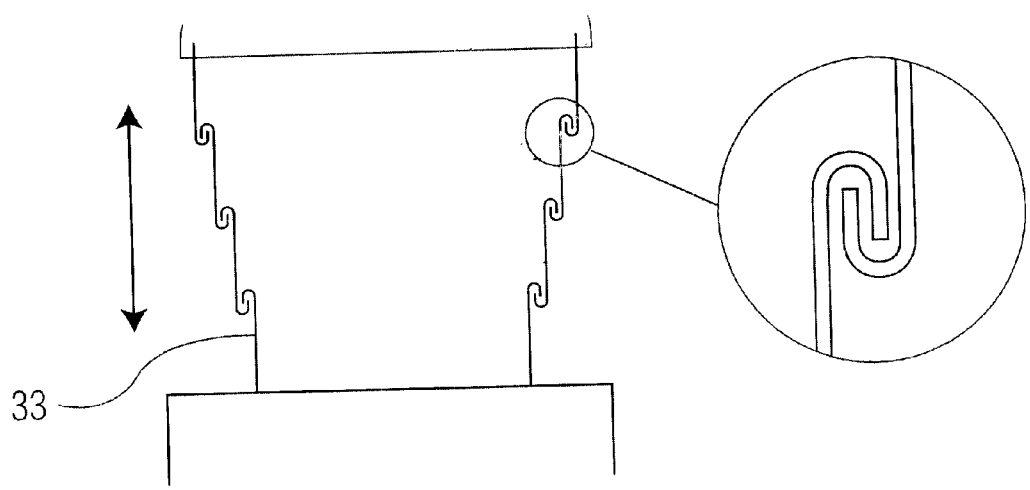
FIG. 19(b) is a cross-sectional view showing a situation in which a lower end of an overlying plate is in mutual engagement with an upper end of the next underlying side plate.

FIGS. 19(a) and 19(b) employ a structure in which as such a material which is retractile in the vertical direction and has a water-proof characteristic, a plurality of side plates 33, the lateral direction of which is the longitudinal direction, are employed, so that when the roof portion is set up above, a lower end of an overlying side plate is mutually engaged with an upper end of an underlying side plate 33 to form a wall between the vehicle body roof portion.

In the present invention, as shown in FIG. 20, it is possible to employ a structure in which a load garage 34 is provided in a rear end portion of the vehicle, and the garage 34 is pivotally joined to a rear end portion of a wall portion of the vehicle in either the right or the left direction.

Figure 20A:
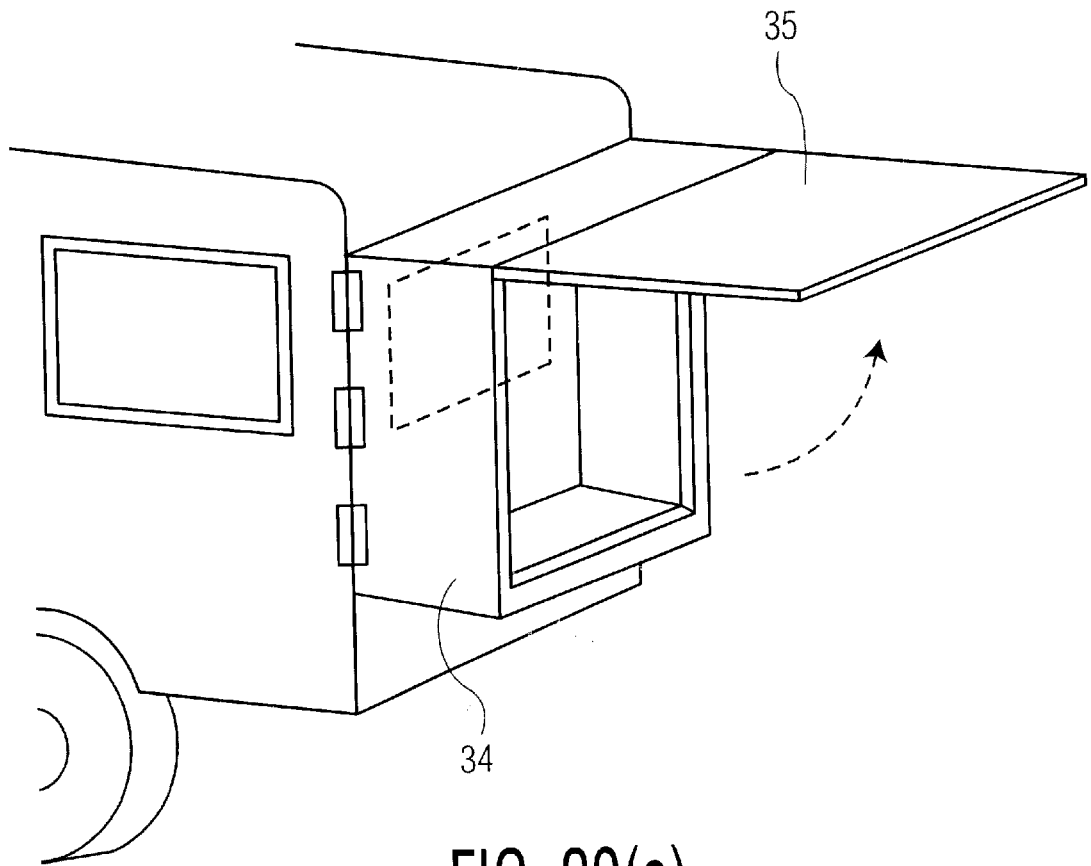
FIG. 20(a) shows the case where a door of the load garage can be opened and closed in the vertical direction.
Figure 20B:
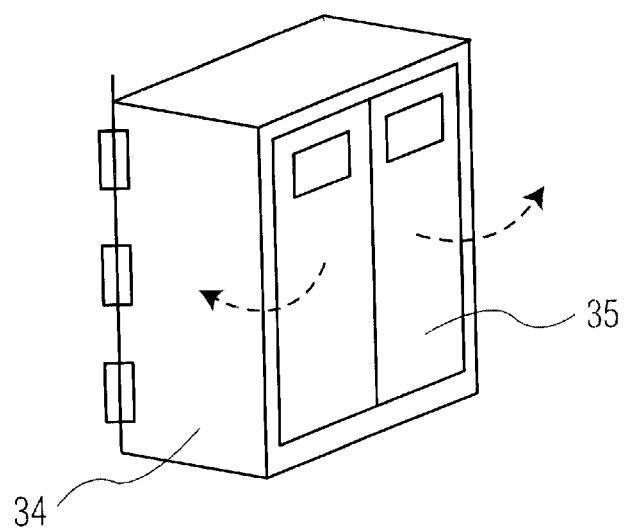
FIG. 20(b) shows the case where the door is pivotable on both left and right sides.

In this event, for a door 35 on the rear end side, it is possible to employ a structure in which it is pivotable in the vertical direction as shown in FIG. 20(a), or it is pivotable in the horizontal direction as shown in FIG. 20(b).

In this way, by providing the load garage 34 in the rear end portion of the vehicle, articles required for camping or normal running can be preserved in the garage.

In addition, since the garage itself is pivotable in the rear end portion of the vehicle, entrance and exit and putting in and out of loads in the rear end portion of the vehicle are also possible, so that the space of the vehicle can be versatilely utilized.

The camping car in the present invention is desirably a high floor four-WD car from the running performance, and the size of approximately a one-box car of three numbers during normal running is a size of up to about 1.8 m in width, 5.0 m in length and 2.0 m in height.

Industrial Applicability

The vehicle of the present invention can be normally used in a size of up to about a one-box car of three numbers and the roof portion of the vehicle can be set above for camping and so on such that adults can live in a standing posture there.

It is therefore possible to use the vehicle according to the present inventions normally for shopping, commutation and so on at a low fuel consumption without any problem in a normal way, and readily run narrow roads and dirt roads when going camping or the like.

Moreover, when the independent room is provided, it is possible to extremely readily convert into a full-scale camping car having an independent room optimal for an adult to use shower, toilet, cooking and so on in a standing posture in addition to a conventionally employed bed.

Moreover, when the independent room is made ventilable, the vehicle is not filled with humidity, smell, or injurious gas, and hence is very comfortable. When refuge is suddenly required, the vehicle can be immediately moved as it is for refuge, so long as the refuge for a short distance is required. In this way, a variety of use implementations are available.

Thus, the present invention can be applied to diversified applications, and its value is tremendous.

What is claimed is:

1. A camping car, comprising:
   a main body having an inside area,
   a first diaphragm for separating the inside area into front and rear spaces, the rear space being adapted to be set up as an independent room for a shower, toilet and cooking,
   a roof having a roof portion thereof that can be raised higher than that occurring with a normal running state of the camping car for providing an upper raised portion in the camping car in order to ensure a life space within the camping car, wherein the roof portion is separable into right and left sections, being pivotable on right and left sides of the main body, respectively, such that when the roof portion is raised to an upper position, the right and left sections of the roof portion are utilized as side walls,
   a second diaphragm coupled to an upper side of the first diaphragm and separating the upper raised portion in the camping car into front and rear spaces when said roof portion is raised up, and
   a water-proof sheet which covers the roof portion and forms a ceiling.

2. The camping car according to claim 1,
   further comprising a reinforcement post erected between the right and left sections of the roof portion, and
   wherein the water-proof sheet covers the right and left roof portions and the reinforcement post.

3. A camping car, comprising:
   a main body having an inside area,
   a first diaphragm for separating the inside area into front and rear spaces, the rear space being adapted to be set up as an independent room for a shower, toilet and cooking,
   a roof having a roof portion thereof that can be raised higher than that occurring with a normal running state of the camping car for providing an upper raised portion in the camping car in order to ensure a life space within the camping car, wherein the roof portion includes at least one pivotable section,
   a second diaphragm coupled to an upper side of the first diaphragm and separating the upper raised portion in the camping car into front and rear spaces when said roof portion is raised up,
   a reinforcement post erected on the main body of the camping car and extending upwardly when the roof portion is pivoted up, and
   a water-proof sheet held by the reinforcement post over an upper opening in said main body of said camping car which is created when said roof portion is pivoted up, and thereby forms a ceiling for the main body of the camping car.

4. A camping car, comprising:
   a main body having an inside area,
   a first diaphragm for separating the inside area into front and rear spaces, the rear space being adapted to be set up as an independent room for a shower, toilet and cooking,
   a roof having a roof portion thereof that can be raised higher than that occurring with a normal running state of the camping car for providing an upper raised portion in the camping car in order to ensure a life space within the camping car,
   a second diaphragm coupled to an upper side of the first diaphragm and separating the upper raised portion in the camping car into front and rear spaces when said roof portion is raised up, and
   a water-proof sheet worth a mesh window for covering an upper opening in the main body of the camping car when the roof portion is raised.

5. The camping car according to claim 4, wherein the roof portion of the camping car is parallel with a ground surface on which the camping car is located when the roof portion is raised up.

6. The camping car according to claim 4, further comprising a hydraulic cylinder for lifting up the roof portion, the hydraulic cylinder positioned between an inner wall and an outer wall of the main body of the camping car by employing a movable rod of the hydraulic cylinder.

7. The camping car according to claim 4, further comprising at least one pair of an upper post and a lower post, the upper post pivotally mounted to the roof portion at an upper end thereof, the lower post pivotally mounted to the main body of the camping car at a lower end thereof, and an upper end of the lower post and a lower end of the upper post being pivotally connected together, such that the roof portion can be raised up by adjusting an angle at which the upper post intersects the lower post.

8. The camping car according to claim 4, further comprising diagonal rods of equal length provided at at least one position and pivotable about a fulcrum at a center connection therebetween, such that the roof portion of the camping car can be raised up based on a change in a cross angle of the diagonal rods.

9. A camping car, comprising:

a main body having an inside area, a first diaphragm for separating the inside area into front and rear spaces, the rear space being adapted to be set up as an independent room for a shower, toilet and cooking, a roof having a roof portion thereof that can be raised higher than that occurring with a normal running state of the camping car for providing an upper raised portion in the camping car in order to ensure a life space within the camping car, wherein the roof portion has at least one side which is pivotable to expose an upper opening in the main body of the camping car, a second diaphragm coupled to an upper side of the first diaphragm and separating the upper raised portion in the camping car into front and rear spaces when said roof portion is raised up, an elastic post connected with the main body of the camping car, and a water-proof sheet held by the roof and the elastic post so as to cover the upper opening in the main body of the camping car when the roof portion is pivoted to a raised position.

10. A camping car, comprising:

a main body having an inside area, a first diaphragm for separating the inside area into front and rear spaces, the rear space being adapted to be set up as an independent room for a shower, toilet and cooking, a roof having a roof portion thereof that can be raised higher than that occurring with a normal running state of the camping car for providing an upper raised portion in the camping car in order to ensure a life space within the camping car, a second diaphragm coupled to an upper side of the first diaphragm and separating the upper raised portion in the camping car into front and rear spaces when said roof portion is raised up, and a water-proof sheet which covers an upper opening in the main body of the camping car when the roof portion is raised up, the water-proof sheet being manually attached to the main body of the camping car after the roof portion of the camping car is lifted up.

11. A camping car, comprising:

a main body having an inside area, a first diaphragm for separating the inside area into front and rear spaces, the rear space being adapted to be set up as an independent room for a shower, toilet and cooking, a roof having a roof portion thereof that can be raised higher than that occurring with a normal running state of the camping car for providing an upper raised portion in the camping car in order to ensure a life space within the camping car, a second diaphragm coupled to an upper side of the first diaphragm and separating the upper raised portion in the camping car into front and rear spaces when said roof portion is raised up, and a vertically retractable material interposed between an upper portion of the main body of the camping car and the roof portion.

12. The camping car according to claim 11, wherein the vertically retractable material includes a plurality of side plates, each having a lengthwise dimension in a lateral direction such that, when the roof portion is raised up, a lower end of an overlying side plate mutually engages with an upper end of a next side plate positioned below the overlying side plate to form a wall between the main body of the camping car and the roof portion.

13. A camping car, comprising:

a main body having an inside area, a first diaphragm for separating the inside area into front and rear spaces, the rear space being adapted to be set up as an independent room for a shower, toilet and cooking, a roof having a roof portion thereof that can be raised higher than that occurring with a normal running state of the camping car for providing an upper raised portion in the camping car in order to ensure a life space within the camping car, a second diaphragm coupled to an upper side of the first diaphragm and separating the upper raised portion in the camping car into front and rear spaces when said roof portion is raised up, and a load garage provided in a rear end portion of the main body of the camping car, the garage being pivotally joined to a rear end portion of a wall of the camping car for pivotal movement in one of a left and right direction of the main body.

14. The camping car according to claim 13, wherein the garage includes a door provided at a rear portion of the garage and which can be opened and closed in one of:

a horizontal direction, and a vertical direction.

15. A camping car, comprising:

a main body having an inside area, a first diaphragm for separating the inside area into front and rear spaces, the rear space being adapted to be set up as an independent room for a shower, toilet and cooking, a roof having a roof portion thereof that can be raised higher than that occurring with a normal running state of the camping car for providing an upper raised portion in the camping car in order to ensure a life space within the camping car, a second diaphragm coupled to an upper side of the first diaphragm and separating the upper raised portion in the camping car into front and rear spaces when said roof portion is raised up, a garage provided in the independent room, and a toilet stool for a simple toilet stored in the garage.

16. The camping car according to claim 15, further comprising a ventilating opening in communication with an outside of the camping car and provided in one of:

a floor of the garage, and a ceiling of the main body of the camping car.

17. A camping car, comprising:

a main body having an inside area, a first diaphragm for separating the inside area into front and rear spaces, the rear space being adapted to be set up as an independent room for a shower, toilet and cooking, a roof having a roof portion thereof that can be raised higher than that occurring with a normal running state of the camping car for providing an upper raised portion in the camping car in order to ensure a life space within the camping car, a second diaphragm coupled to an upper side of the first diaphragm and separating the upper raised portion in the camping car into front and rear spaces when said roof portion is raised up, and a door for freely entering and exiting the independent room from a front side of the camping car.

18. A camping car, comprising:

a main body having an inside area, a first diaphragm for separating the inside area into front and rear spaces, the rear space being adapted to be set up as an independent room for a shower, toilet and cooking, wherein the independent room has at least two rooms for purposes of cooking, toilet, shower and lavatory, a roof having a roof portion thereof that can be raised higher than that occurring with a normal running state of the camping car for providing an upper raised portion in the camping car in order to ensure a life space within the camping car, a second diaphragm coupled to an upper side of the first diaphragm and separating the upper raised portion in the camping car into front and rear spaces when said roof portion is raised up.

19. A camping car, comprising:

a main body having an inside area, a first diaphragm for separating the inside area into front and rear spaces, the rear space being adapted to be set up as an independent room for a shower, toilet and cooking, a roof having a roof portion thereof that can be raised higher than that occurring with a normal running state of the camping car for providing an upper raised portion in the camping car in order to ensure a life space within the camping car, a second diaphragm coupled to an upper side of the first diaphragm and separating the upper raised portion in the camping car into front and rear spaces when said roof portion is raised up, a spoiler on the main body of the camping car, and a forced pumping fan positioned below the spoiler.

20. A camping car, comprising:

a main body having an inside area, a first diaphragm for separating the inside area into front and rear spaces, the rear space being adapted to be set up as an independent room for a shower, toilet and cooking, a roof having a roof portion thereof that can be raised higher than that occurring with a normal running state of the camping car for providing an upper raised portion in the camping car in order to ensure a life space within the camping car, wherein a front end portion of the roof portion is pivotally connected with the main body of the camping car, a second diaphragm coupled to an upper side of the first diaphragm and separating the upper raised portion in the camping car into front and rear spaces when said roof portion is raised up, and a water-proof sheet which covers right and left sides and a rear potion of the roof portion and the second diaphragm to form the independent room, when a rear side of the roof portion is pivoted upward.

21. A camping car, comprising:

a main body having an inside area, a first diaphragm for separating the inside area into front and rear spaces, the rear space being adapted to be set up as an independent room for a shower, toilet and cooking, a roof having a roof portion thereof that can be raised higher than that occurring with a normal running state of the camping car for providing an upper raised portion in the camping car in order to ensure a life space within the camping car, a second diaphragm coupled to an upper side of the first diaphragm and separating the upper raised portion in the camping car into front and rear spaces when said roof portion is raised up, a cross-section L-shaped wall formed with the roof portion and a rear side wall of the main body and making the rear side portion of the roof portion of the vehicle pivotable, and a water-proof sheet which covers the L-shaped wall when the roof portion is pivoted upward to form the independent room.

22. A camping car, comprising:

a main body having an inside area, a first diaphragm for separating the inside area into front and rear spaces, the rear space being adapted to be set up as an independent room for a shower, toilet and cooking, a roof having a roof portion thereof that can be raised higher than that occurring with a normal running state of the camping car for providing an upper raised portion in the camping car in order to ensure a life space within the camping car, a second diaphragm coupled to an upper side of the first diaphragm and separating the upper raised portion in the camping car into front and rear spaces when said roof portion is raised up, a packing material between the roof portion and the main body of the vehicle, and a plurality of latching members for fixing the roof portion to the main body when said camping car is running.

* * * * *